July 20, 1954

T. J. SMULSKI 2,683,985

SCALE

Filed March 23, 1945

INVENTOR
THEODORE J. SMULSKI
BY
Moses, Nolte, Crews & Berry
ATTORNEYS

July 20, 1954     T. J. SMULSKI     2,683,985
SCALE

Filed March 23, 1945     2 Sheets-Sheet 2

INVENTOR
THEODORE J. SMULSKI
BY
Moses, Nolte, Crews & Berry
ATTORNEYS

Patented July 20, 1954

2,683,985

UNITED STATES PATENT OFFICE 2,683,985

SCALE

Theodore J. Smulski, Gary, Ind., assignor to Productive Inventions, Inc., a corporation of Indiana Application March 23, 1945, Serial No. 584,432

22 Claims. (Cl. 73—141)

This invention relates to scales. While a number of features of the invention are of broad utility, the illustrated scale has been devised especially as a pocket scale for testing the pressure of a windshield wiper arm against a windshield and guiding a service station attendant in adjusting the spring pressure of the arm.

A scale designed for the service referred to is desirably made flat and of simple and light construction so that it can be conveniently carried in the pocket of a service station attendant. It is also made thin and flat so that it may be inserted between the wiper arm and the windshield in place of the wiper blade, and with the wiper arm substantially in its normal position. The scale is desirably provided with windows in the front and back, with a two faced dial, and with a pointer that operates at opposite sides of the dial so that it can be read from opposite sides simultaneously by the attendant standing in front of the windshield and by the customer sitting in the driver's seat.

It is a further object of the invention to provide a comparatively inexpensive scale which is substantially without friction.

It is a further object of the invention to provide a scale which is shock proof.

It is a further object of the invention to provide a scale having provision for a zero setting without disturbing the rate of spring deflection to load, and having provision for adjusting the rate of spring deflection to load without disturbing the zero setting.

Still further objects have to do with providing a scale which is economical to manufacture, rugged in service, and dependable in performance.

It is a salient feature of the invention that the scale comprises a thin casing having substantially parallel front and rear walls, a leaf spring within the casing, a load bearing member carried at one end of the leaf spring and movable through the casing, a movable indicator, a spiral cam affixed to the indicator, and a cam actuator carried by and with the load bearing member.

It is a further feature of the invention that the load measuring spring comprises a plurality of legs that extend side by side, the spring being supported and anchored at the end of one of said legs and being connected to the load bearing member at the end of the other of said legs, and that an arm is provided for adjusting the deflection rate of the spring, the arm being adjustably mounted on one of the legs and engageable with the other so that a greater or lesser length of the spring is reinforced according to the adjustment of the arm.

It is a further feature of the invention that the load measuring spring is composed of a plurality of parallel substantially congruent leaves which are anchored and supported at a short distance from one another at one point and are secured at a like distance from one another at the point of connection to the load bearing member. With this arrangement the load bearing member is caused to move substantially straight up and down and not in a curved path as it would if a single supporting leaf were employed. There is no friction in this part of the apparatus.

It is a further feature of the invention that the movement of the load bearing member transversely of the spring plane is caused to drive the pointer parallel to the spring plane through a spiral cam affixed to the pointer and a cam actuator carried by and with the load bearing member.

It is a still further feature that the cam actuator is mounted for pivotal adjustment about an axis substantially parallel to the direction of movement of the load bearing member and that means is provided for frictionally detaining the cam actuator in different positions of adjustment. Through this means a simple and dependable zero setting is obtained.

Other objects and advantages will hereinafter appear.

In the drawing forming part of this specification

Figure 1:
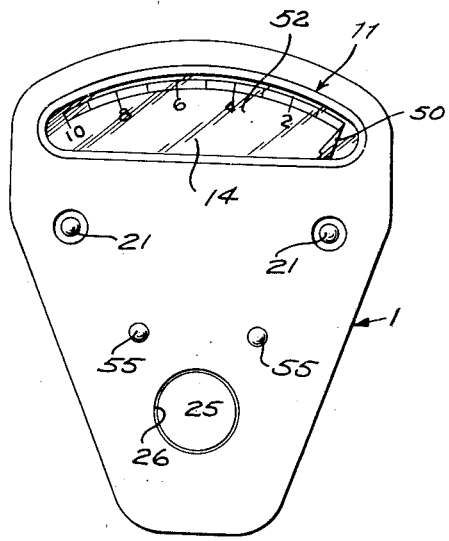
Fig. 1 is a view in front elevation of a pocket scale embodying features of the present invention.

The scale comprises front and rear casing members 1 and 2. Casing member 1 includes a front wall 3 and a flange portion 4 which forms side walls of the casing. The rear casing member 2 comprises a rear wall 5, a double thickness peripheral flange 6 and a flange 7 which forms side walls all the way around on the rear casing member. The wall 7 is adapted to fit within the wall 4 with the wall 4 standing substantially continuously in engagement with the flange 6.

The casing member 2 is provided with three rubber feet 8, which are secured to the face 5 of the casing member in any suitable manner as by means of a rubber cement.

Figure 3:
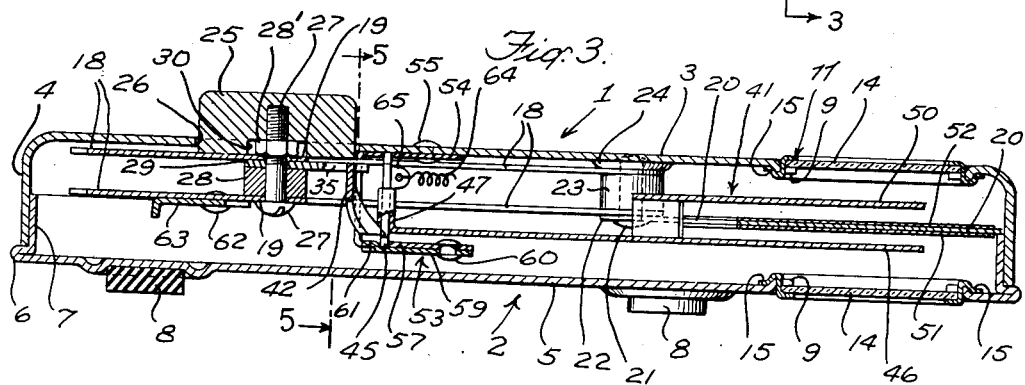
Fig. 3 is a sectional view taken upon the line 3—3 of Fig. 2 looking in the direction of the arrows, Fig. 3 being, however, upon a larger scale than Fig. 2.
Figure 4:
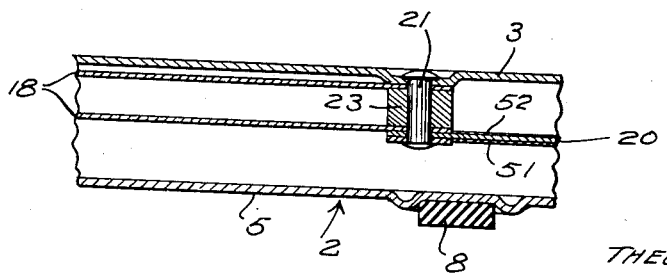
Fig. 4 is a fragmentary sectional view upon the same scale as Fig. 3, the section being taken upon the line 4—4 of Fig. 2 looking in the direction of the arrows.
Figure 5:
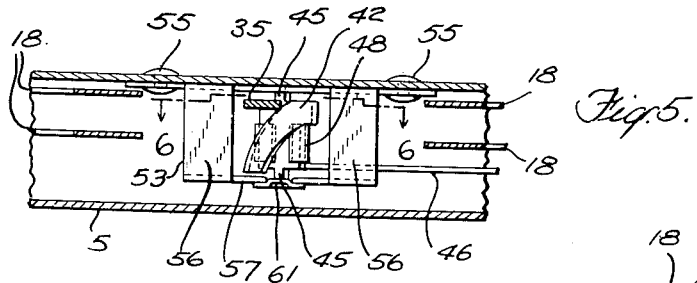
Fig. 5 is a fragmentary sectional view taken upon the line 5—5 of Fig. 3 looking in the direction of the arrows.
Figure 7:
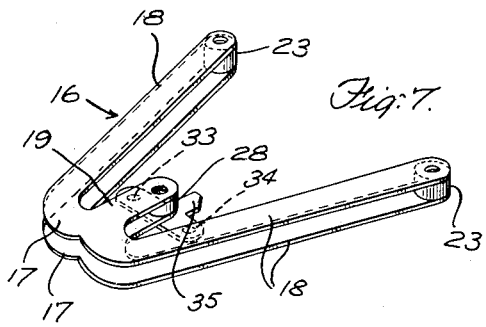
Fig. 7 is a perspective view showing particularly the leaf spring employed.

The casing member 2 is provided with a window opening which is surrounded by an inwardly offset pane seat 9. The pane seat 9 extends continuously around the window opening save that notches 10 are provided at intervals. A pane frame 11 is provided, this frame including face and flange portions 12 and 13. The face portion overlies the face of a pane 14 while the flange portion 13 surrounds the pane and fits down within the recess formed by inward displacement of the pane seat 9. The flange portion 13 has integral with it a number of fingers 15 which desirably correspond in spacing and number with the notches 10 of the casing member 2. The fingers 15 are adapted to be passed through the notches 10 and then to be folded outward as best seen in Fig. 3.

An identical window structure is provided in the wall 3 of casing member 1. Since there is no difference in the construction of the parts, the last mentioned window and its mounting means will not be described in detail, but corresponding parts have been given corresponding reference numerals and the foregoing description of the rear window and its mounting means may be taken as fully applicable.

All of the scale mechanism is carried by the forward casing member 1. The scale employs a leaf spring 16 which comprises a pair of spaced parallel leaves 17. Each leaf 17 comprises outer legs 18 whose free ends are widely separated, and an intervening short leg or re-entrant portion 19. Means are provided for anchoring the leaves 18 in spaced relation to the casing member 1 together with a dial plate 20 (see Fig. 3). In association with the ends of the legs 18 at each side of the spring 16 there is provided a rivet 21 which is passed successively through an ear 22 of the dial plate 20, one of the legs 18, a spacing collar 23, a corresponding leg 18 of the other spring, and a spacing washer 24. At the free ends of the legs 19 the springs are also secured to one another in spaced relation, the spacing being the same as that provided by the collars 23, and the spring is connected to a load carrying member 25 which projects through an opening 26 formed in the wall 3. A headed screw 27 is passed through one of the legs 19, then through a spacing collar 28 and a cam actuator 29 which will be described presently, and a second leg 19. The screw 27 is then threaded through a lock nut 28' which is contained within a recess 30 of the member 25 and is finally threaded into the member 25 itself. With the arrangement described a frictionless leaf spring is provided. The spring structure is very compact and is well adapted to be used within the thin flat casing, and yet the load carrying member 25 is constrained to move straight up and down, and not in a curved path as would be the case if only a single leaf were employed.

Figure 2:
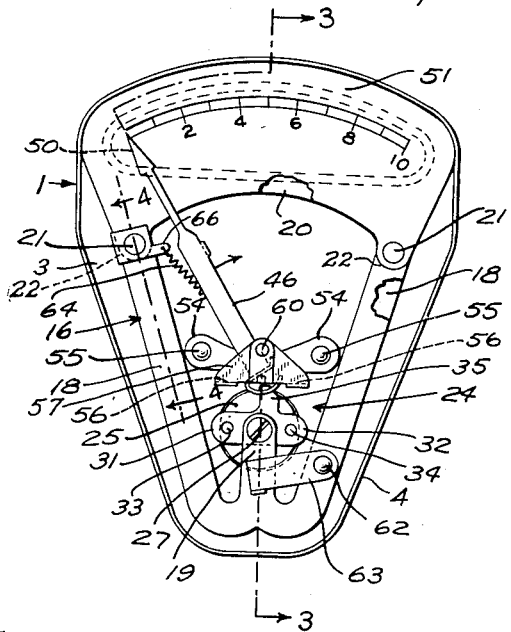
Fig. 2 is a view in rear elevation of the structure illustrated in Fig. 1 but with the rear casing member removed.
Figure 6:
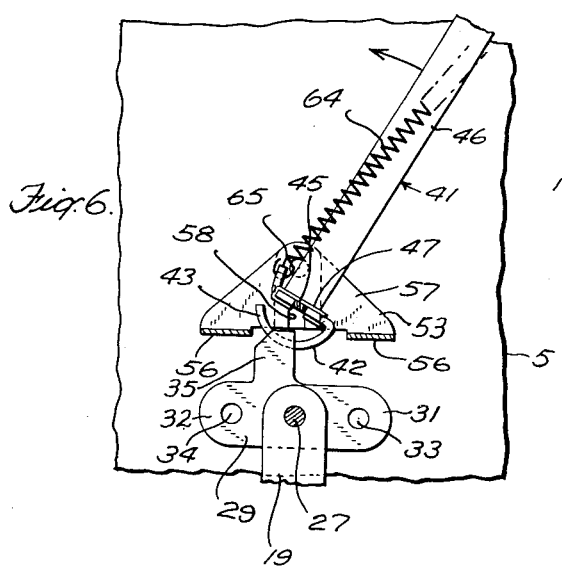
Fig. 6 is a fragmentary detailed sectional view looking from the front and illustrating particularly a spiral cam and cam actuator together with fragments of associated parts.
Figure 8:
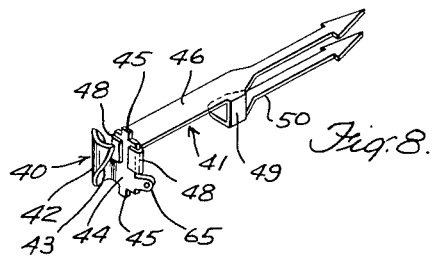
Fig. 8 is a perspective view showing the pointer and the actuating cam for the pointer.
Figure 9:
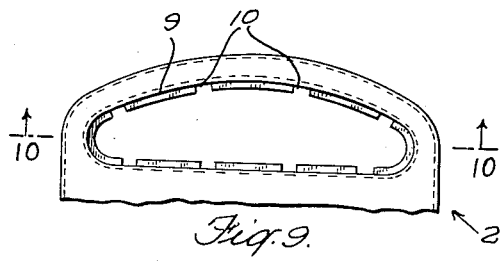
Fig. 9 is a fragmentary view of one of the casing members as seen from the inside.
Figure 11:
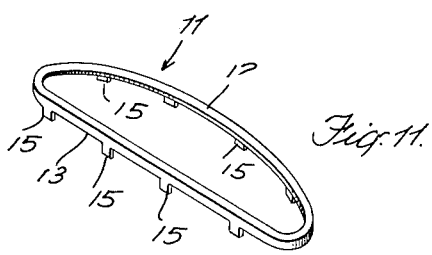
Fig. 11 is a perspective view of a pane frame employed in conjunction with the structure illustrated in Figs. 9 and 10.
Figure 10:
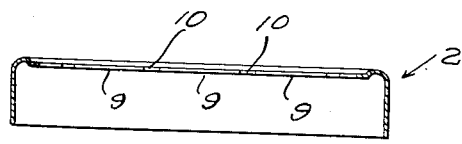
Fig. 10 is a sectional view taken upon the line 10—10 of Fig. 9 looking in the direction of the arrows.

The cam actuating member 29 is in the form of a three armed lever as best seen in Figs. 2 and 6. The lever, as has already been mentioned, is impaled upon the screw 27 and is held frictionally clamped by the nut 28' in cooperation with the head of the screw 27. Two of the arms 31 and 32 are adapted for convenient use in adjusting the cam actuator 29 about the axis of the screw 27. These arms are provided respectively with small holes 33 and 34 into which a tool can be inserted for moving the member 29 against the frictional resistance with which it is held in place. The third arm 35 of the actuator 29 is for engaging a spiral cam 40 which is fixedly connected to a pointer 41.

The cam 40 includes a cylindrical portion 42 upon which a spiral cam surface 43 is formed. The cam also includes an upright body portion 44 which terminates at its opposite ends in pivot pins 45. The pointer 41 includes an arm 46 having an angularly turned end portion 47 from which fingers 48 extend. Fingers 48 are wrapped securely around the body portion 44 of the cam 40 so that the pointer moves in unison with the cam. The pointer body 46 extends over the rear face of the dial plate 20. This portion of the pointer has a side extension 49 which extends forwardly and which has formed integrally with it a second pointer branch 50 which operates over the front face of the dial. The dial plate 20 has printed dial sheets 51 and 52 secured, as by adhesion, to its opposite faces.

The pins 45 are pivotally mounted in a U-shaped bracket 53. The bracket 53 comprises a bearing base 54 which includes wing portions at its opposite ends (see Fig. 2). Rivets 55 are passed through the wing portions of the base 54 and through the casing wall 3 for securing the bracket 53 to the wall 3. The bracket further includes legs 56, spaced from one another to permit the cam to operate substantially between them, which extend transversely of the casing and support a further bearing portion 57 in which an opening or slot 58 is formed.

A spring arm 59 is pivotally secured to the bearing portion 57 by means of a rivet 60. The arm 59 has an offset portion 61 which is adapted to snap into a portion of the slot 58 and, in cooperation with the end and sides of the slot to define a bearing for one of the pivot pins 45. When assembling the cam 40 with the bracket 53, one of the bearing pins 45 is first inserted in a bearing opening formed in the base 54, and the other pin 45 is then introduced into the slot 58. The spring arm 59 is then turned to lodge the offset 61 in the slot.

The short leg 19 of each spring leaf 17 extends alongside each of the longer legs 18 of the same leaf. Against the rear face of one of the legs 18 of the rearward spring 17 there is frictionally secured, by means of a rivet 62, a spring adjusting arm 63. The arm 63 bears against the rear face of the arm 19 and serves to reinforce the spring. By adjusting the arm 63, the reinforcement can be applied to a greater or lesser length of the spring, thereby changing the deflection rate of the spring. The rate of spring deflection can, therefore, be brought into harmony with the dial calibrations.

A light coil spring 64 is provided for drawing the pointer 46 toward zero position and for keeping the cam 40 in engagement with the arm 35 of the cam actuator 29. The spring is connected at one end to an ear 65 of the cam and at the opposite end to a stationary finger 66.

The zero setting adjustment and the spring rate adjustment are independent of one another and are mutually nonconflicting. The zero condition of the spring leaves is a flat condition. This condition is not affected by adjustment of the arm 63, nor is movement of the arm 63 resisted, otherwise than frictionally, with the spring leaves in this condition. The zero setting adjustment is accomplished merely by angularly adjusting the actuator 29. Either adjustment can be made first, since it will not be disturbed by the making of the other adjustment.

I have described what I believe to be the best embodiments of my invention. I do not wish, however, to be confined to the embodiments shown, but what I desire to cover by Letters Patent is set forth in the appended claims.

I claim:

1. A scale comprising, in combination, a thin flat casing having substantially parallel front and rear walls and a window, a leaf spring mounted in the casing, a load bearing member accessible outside the casing and connected to the spring for movement transversely of said walls, a dial within the casing, a pointed cooperative with the dial and visible through said window, means supporting the pointer for movement about an axis that extends substantially in the direction of movement of said load bearing member, a spiral cam connected to the pointer, and a cam actuating member secured in normally fixed relation to said load bearing member.

2. A scale comprising, in combination, a thin flat casing having substantially parallel front and rear walls and a window, a leaf spring mounted in the casing, a load bearing member accessible outside the casing and connected to the spring for movement transversely of said walls, a dial within the casing, a pointer cooperative with the dial and visible through said window, means supporting the pointer for movement about an axis that extends substantially in the direction of movement of said load bearing member, a spiral cam connected to the pointer, a cam actuating member movable with the load bearing member, and means for detaining the cam actuating member in different positions relative to the load bearing member.

3. A scale comprising, in combination, a thin flat casing having substantially parallel front and rear walls, a leaf spring mounted in the casing, a load bearing member accessible outside the casing and connected to the spring for movement transversely of said walls, a dial within the casing, a pointer cooperative with the dial, means supporting the pointer for movement about an axis that extends substantially in the direction of movement of said load bearing member, a spiral cam connected to the pointer, a cam actuating member movable with the load bearing member, means supporting the cam actuating member with capacity for adjustment relative to the load bearing member about an axis parallel to the cam axis, and means for frictionally holding the cam actuating member in different positions of angular adjustment.

4. A scale comprising, in combination, a casing having front and rear walls, a leaf spring mounted in the casing to extend in general parallelism at least with one of said walls, said leaf spring having a pair of connected outer legs whose free ends are spaced from one another, and an intervening leg, means anchoring the free ends of the outer legs to one of said casing walls, a load carrying member secured to the free end of the intervening leg and extending through the last mentioned casing wall for movement transversely of the wall, an indicator member mounted for movement about an axis substantially parallel to the direction of movement of the load bearing member, a cam connected to the indicator member, and a cam actuating member secured in normally fixed relation to said load bearing member.

5. A scale comprising, in combination, a casing, a leaf spring mounted in the casing, said leaf spring comprising a plurality of parallel substantially congruent leaves, each including a pair of connected outer legs whose free ends are spaced from one another and are anchored to a portion of the casing, and an intervening leg, a load carrying member connected to the intervening legs of the spring leaves, an indicator member mounted for movement about an axis substantially perpendicular to the spring leaves, and an actuator for the indicator member carried by the load carrying member.

6. A scale comprising, in combination, a casing having substantially front and rear walls, a leaf spring mounted in the casing to extend alongside at least one of said walls, said leaf spring comprising a plurality of leaves, each including a pair of connected outer legs whose free ends are spaced from one another and are anchored to one of the walls and an intervening leg, a load carrying member connected to the intervening legs of the spring leaves and extending through one wall for movement transversely thereof, an indicator member mounted on said one wall for movement about an axis substantially perpendicular to the spring leaves, and an actuator for the indicator member carried by the load carrying member.

7. A scale comprising, in combination, a casing having front and rear walls, a window provided in one of said walls, a leaf spring mounted in the casing to extend alongside at least one of said walls, said leaf spring comprising a plurality of leaves, each including a pair of connected legs whose free ends are spaced from one another and are anchored to one of the casing walls and a re-entrant portion, a load bearing member connected to said re-entrant portion, a dial, means anchoring the dial to the outer legs of the spring and in parallelism with the casing walls, a pointer visible through said window, means pivotally supporting the pointer adjacent the load bearing member, and an actuator for the pointer carried by the load bearing member.

8. A scale comprising, in combination, a casing having front and rear walls each having a window, an opening in one of said walls, a leaf spring mounted in the casing, a load bearing member, accessible by means of said opening and connected to the spring for movement transversely of said casing walls, a two faced dial mounted within the casing in substantial parallelism with the walls and spaced from both of them, a bifurcated pointer visible through said windows and embracing the dial, means supporting the pointer for movement in the plane of the dial, and a pointer actuator carried by the load bearing member.

9. A scale comprising, in combination, a casing having substantially parallel walls, each having a window, a leaf spring mounted in the casing on one of the walls, said spring including a plurality of parallel congruent leaves, each having a pair of outer legs whose free ends are spaced and a re-entrant portion, a two faced dial, means anchoring the free extremities of the outer spring legs and the dial in fixed positions, a bifurcated pointer embracing the dial and mounted for pivotal movement parallel to the dial, a cam having a curved surface affixed to the pointer, a load bearing member connected to the re-entrant portion of the spring leaves, and extending through a wall of the casing for movement transversely thereof, and a cam actuator carried by the load bearing member having a portion adapted to engage said curved surface.

10. A scale comprising, in combination, a leaf spring, which includes two connected legs that extend alongside one another, one of said legs being supported and anchored at its free end, a load bearing member connected with the free end of the other leg, an indicator member, mechanism for operating the indicator member from the load bearing member, and a spring adjusting arm pivotally connected to one of said legs for movement over a surface of the other, said adjusting arm serving to reinforce a greater or lesser length of spring according to the adjustment setting of the arm.

11. A scale comprising, in combination, a leaf spring, which includes two connected legs that extend alongside one another, one of said legs being supported and anchored at its free end, a load bearing member connected with the free end of the other leg, an indicator member, mechanism for operating the indicator member from the load bearing member, a spring adjusting arm, and means for pivotally securing the arm to one of said legs and for frictionally opposing movement thereof, said arm being operable on the other leg and serving to reinforce a greater or lesser length of the spring according to the adjustment setting of the arm.

12. A scale comprising, in combination, a leaf spring, which includes two connected legs that extend alongside one another, one of said legs being supported and anchored at its free end, a load bearing member connected with the free end of the other leg, an indicator member, mechanism for operating the indicator member from the load bearing member, a spring adjusting arm, means riveting the adjusting arm to one of the legs, said arm being operable with respect to the other leg and serving to reinforce a greater or lesser length of the spring according to the adjustment setting of the arm.

13. A scale comprising, in combination, a load measuring leaf spring having a pair of connected legs that extend alongside one another, a spring adjusting arm, and means for pivotally securing the arm to one of said legs and for frictionally opposing movement thereof, said arm being operable along the other leg and serving to reinforce a greater or lesser length of the spring according to the adjustment setting of the arm.

14. A scale comprising, in combination, a load measuring leaf spring having a pair of connected legs that extend alongside one another, a spring adjusting arm, and means supporting said arm on the spring in engagement with both said legs but with capacity for adjustment to engage one leg at more or less widely spaced points measured along the spring.

15. A scale comprising, in combination, a load measuring leaf spring having a pair of connected outer legs whose free ends are spaced from one another and an intervening leg, means for anchoring the free ends of the outer legs to a casing, a load bearing member connected to the free end of the intervening leg, and an arm engaged with the intervening leg and one of the outer legs and pivotally mounted on one of said engaged legs for adjustment along the other, and serving to reinforce a greater or lesser length of the spring according to the adjustment setting of the arm.

16. A scale comprising, in combination, a casing having front and rear walls and a dial, a load measuring spring comprising a plurality of parallel spring leaves clamped firmly to one another at at least three disaligned points, means anchoring said leaves to one of the walls at a plurality of said points, one of said walls being provided with an opening a load bearing member secured to the leaves at another of said points and accessible by means of said opening, and a pointer operatively connected to the load bearing member and movable relative to the dial when the load bearing member is actuated.

17. A scale comprising, in combination, a casing having front and rear walls, a leaf spring mounted in the casing to extend alongside at least one of said walls, said leaf spring having a pair of connected legs having extremities spaced from one another, means anchoring the outer extremities of the legs to one of said walls, a load bearing member secured adjacent the point of connection between the legs of said leaf spring and extending through the said one casing wall for movement transversely of said wall, an indicator member mounted for movement about an axis substantially parallel to the direction of movement of the load bearing member, a cam connected to said indicator member, and said load bearing member provided with means for actuating said cam.

18. A scale operating assembly adapted for disposition in a housing comprising a leaf spring including a plurality of leaves, each leaf including a pair of spaced legs connected together adjacent one extremity, the other extremities of said legs being spaced from one another and being adapted for connection to a portion of the housing, a load bearing member connected to the said one extremity of at least one of said leaves and movable transversely with respect thereto, an indicator member mounted for movement about an axis substantially perpendicular to at least one of said spring leaves, and an actuator for the indicator member carried by said load bearing member.

19. A scale comprising, in combination, a casing having front and rear walls, a leaf spring mounted in the casing to extend alongside at least one of said walls, said leaf spring comprising a plurality of leaves, each including a pair of connected legs whose free ends are spaced from one another and are anchored to one of the walls and a re-entrant portion, a load bearing member connected to at least one of the re-entrant portions and extending through said one wall for movement substantially transverse thereof, an indicator member mounted on said one wall for movement about an axis substantially perpendicular to at least one of said spring leaves, and an actuator for the indicator member carried by said load bearing member.

20. A leaf spring assembly for use in conjunction with a scale of the character described comprising a pair of superimposed substantially flat springs, each of said springs including a pair of flat leg portions integrally connected together adjacent one extremity, said pair of said leg portions lying in a single plane means on said extremities supporting a load bearing member, an indicator member operatively connected to at least one of said extremities, and the opposite free ends of said leg portions being constructed and arranged whereby the same may be secured to a stationary support to permit the said extremities of the springs to be manually moved when pressure is applied to the load bearing member to actuate the indicator member.

21. In a weighing scale, the combination of a double cantilever leaf spring of general E-shape comprising spaced outer legs, and an inner leg therebetween and integrally joined at one end to the corresponding ends of the outer-legs, all said legs normally lying in a common plane, supporting means and load carrying means, one of said means being connected to the free end of the inner leg, and the other of said means being connected to the free ends of the outer legs.

22. In a device of the character described, the combination of a double cantilever leaf spring comprising spaced-apart outer legs, an inner leg therebetween and connected at one end to the corresponding ends of the outer legs, said outer legs and said inner leg, respectively, being constructed and arranged to flex under load in the same general direction from a common plane or closely adjacent respective planes in which they normally lie, supporting means and force receiving means, one of said means being connected to the free end of the inner leg, and the other of said means being connected to the ends of the outer legs opposite to said corresponding ends.

References Cited in the file of this patent

UNITED STATES PATENTS

| Number | Name | Date |
|---|---|---|
| 1,233,124 | Powers | July 10, 1917 |
| 1,501,698 | Beckert | July 15, 1924 |
| 1,579,849 | Weston | Apr. 6, 1926 |
| 1,724,734 | Scott et al. | Aug. 13, 1929 |
| 2,059,246 | Kliesrath | Nov. 3, 1936 |
| 2,359,245 | Ritzmann | Sept. 26, 1944 |

FOREIGN PATENTS

| Number | Country | Date |
|---|---|---|
| 112,519 | Germany | Aug. 20, 1900 |
| 25,526 | Great Britain | of 1902 |
| 86,750 | Switzerland | Oct. 1, 1920 |
| 170,392 | Great Britain | Oct. 19, 1921 |
| 435,192 | Germany | Oct. 7, 1926 |
| 259,274 | Italy | June 20, 1928 |
| 739,948 | France | Nov. 3, 1932 |
| 598,581 | Germany | June 13, 1934 |
| 786,861 | France | June 17, 1935 |
| 182,110 | Switzerland | May 1, 1936 |